US010255846B2

(12) United States Patent
Na

(10) Patent No.: US 10,255,846 B2
(45) Date of Patent: Apr. 9, 2019

(54) SCAN DRIVER AND DISPLAY DEVICE INCLUDING THE SAME

(71) Applicant: SAMSUNG DISPLAY CO., LTD., Yongin-si, Gyeonggi-do (KR)

(72) Inventor: Jisu Na, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 16 days.

(21) Appl. No.: 15/498,605

(22) Filed: Apr. 27, 2017

(65) Prior Publication Data

US 2017/0316732 A1 Nov. 2, 2017

(30) Foreign Application Priority Data

Apr. 27, 2016 (KR) ........................ 10-2016-0051597

(51) Int. Cl.

*G06F 3/038* (2013.01)
*G09G 5/00* (2006.01)
*G09G 3/36* (2006.01)
*G09G 5/10* (2006.01)
*G09G 3/20* (2006.01)

(52) U.S. Cl.

CPC ............ *G09G 3/2092* (2013.01); *G09G 3/20* (2013.01); *G09G 2300/0408* (2013.01); *G09G 2310/0267* (2013.01); *G09G 2310/0286* (2013.01); *G09G 2310/0289* (2013.01); *G09G 2310/08* (2013.01)

(58) Field of Classification Search

CPC ... G09G 2310/08; G09G 3/3677; G09G 3/233
See application file for complete search history.

(56) References Cited

U.S. PATENT DOCUMENTS

2013/0342584 A1* 12/2013 Song ........................ G09G 3/30 345/690
2014/0253524 A1* 9/2014 Huang ................ G09G 3/3677 345/204
2015/0029169 A1* 1/2015 Song .................... G09G 3/3225 345/212

FOREIGN PATENT DOCUMENTS

KR 1020140136254 11/2014

* cited by examiner

*Primary Examiner* — Nan-Ying Yang
(74) *Attorney, Agent, or Firm* — F. Chau & Associates, LLC

(57) ABSTRACT

A scan driver includes a plurality of stages, each outputting a scan signal in response to a scan start pulse and clock signals. Each stage includes a first input circuit applying a high gate voltage to a first node in response to the scan start pulse or the scan signal from a previous stage, a second input circuit applying a first clock signal to a second node based on the first node's voltage, a first output circuit outputting a second clock signal as the scan signal in response to the first node's voltage, a second output circuit outputting a low gate voltage as the scan signal in response to the second node's voltage, and a leakage circuit coupled to the high gate voltage and providing a current from the high gate voltage to the second node in response to the voltage of the second node having a high level.

19 Claims, 15 Drawing Sheets at P1 at P2 at P3 at P4 at P5 at P6

SCAN DRIVER AND DISPLAY DEVICE INCLUDING THE SAME

CROSS-REFERENCE TO RELATED APPLICATIONS

This application claims priority under 35 U.S.C. § 119 to Korean Patent Application No. 10-2016-0051597, filed on Apr. 27, 2016 the disclosure of which is incorporated by reference herein in its entirety.

TECHNICAL FIELD

Exemplary embodiments of the present inventive concept relate to a display device, and more particularly, to a scan driver and a display device including the scan driver.

DISCUSSION OF THE RELATED ART

A display device, such as an organic light emitting diode (OLED) display device, a liquid crystal display (LCD) device, etc., includes a display panel having a plurality of pixels arranged in a matrix form, and a driving part for driving the display panel. The driving part may include a scan driver for providing a scan signal (a gate signal) to the pixels of the display panel, and a data driver for providing a data signal to the pixels of the display panel. The pixels may emit light to display an image based on the scan signal and the data signal received from the scan driver and the data driver.

The scan driver may be implemented as an integrated circuit mounted on the display panel or outside of the display panel. Alternatively, the scan driver may be implemented as an embedded scan driver by directly forming thin-film transistors (TFTs) on a substrate of the display panel during a TFT manufacturing process. The embedded scan driver may be implemented by forming amorphous silicon (a-Si) TFTs, low temperature polycrystalline silicon (LTPS) TFTs, or metal-oxide TFTs on the substrate of the display panel. a-Si TFTs have low electron mobility, and a process for forming the LTPS TFTs may not be suitable for a large-sized display panel. Thus, a scan driver that uses metal-oxide TFTs is often used for large-sized display devices.

SUMMARY

Exemplary embodiments of the inventive concept provide a scan driver that operates normally when a threshold voltage of a thin-film transistor is shifted.

Exemplary embodiments of the inventive concept provide a display device including the scan driver that operates normally when a threshold voltage of a thin-film transistor is shifted.

According to exemplary embodiments, a scan driver includes a plurality of stages, each of which outputs a scan signal in response to receiving a scan start pulse and a plurality of clock signals. Each stage includes a first input circuit configured to apply a high gate voltage to a first node in response to receiving the scan start pulse, or the scan signal from a previous stage, a second input circuit configured to apply a first one of the plurality of clock signals to a second node in response to a voltage of the first node, a first output circuit configured to output a second one of the plurality of clock signals as the scan signal in response to the voltage of the first node, a second output circuit configured to output a low gate voltage as the scan signal in response to a voltage of the second node, and a leakage circuit coupled to the high gate voltage and configured to provide a current from the high gate voltage to the second node in response to the voltage of the second node having a high level.

In exemplary embodiments, the first input circuit, the second input circuit, the first output circuit, the second output circuit and the leakage circuit each include at least one n-type metal-oxide (NMOS) thin-film transistor.

In exemplary embodiments, the first input circuit includes a first transistor having a gate receiving the scan start pulse or the scan signal from the previous stage, a first terminal coupled to the high gate voltage, and a second terminal coupled to the first node.

In exemplary embodiments, the second input circuit includes a second transistor having a gate coupled to the first node, a first terminal receiving the first one of the plurality of clock signals, and a second terminal coupled to the second node.

In exemplary embodiments, the first output circuit includes a third transistor having a gate coupled to the first node, a first terminal receiving the second one of the plurality of clock signals, and a second terminal coupled to an output node, and a first capacitor having a first electrode coupled to the first node and a second electrode coupled to the output node.

In exemplary embodiments, the second output circuit includes a fourth transistor having a gate coupled to the second node, a first terminal coupled to an output node, and a second terminal coupled to the low gate voltage, and a second capacitor having a first electrode coupled to the second node and a second electrode coupled to the low gate voltage.

In exemplary embodiments, each stage further includes a first refresh circuit configured to maintain the voltage of the first node as a low level, and a second refresh circuit configured to maintain the voltage of the second node as the high level.

In exemplary embodiments, the first refresh circuit includes a fifth transistor coupled between the first node and an output node, a sixth transistor having a gate receiving the second one of the plurality of clock signals and a second terminal, and a seventh transistor having a gate coupled to the second node, a first terminal coupled to the second terminal of the sixth transistor, and a second terminal coupled to the output node.

In exemplary embodiments, the fifth transistor is configured to connect the first node to the output node in response to the first one of the plurality of clock signals.

In exemplary embodiments, the fifth transistor included in an N-th one of the plurality of stages is configured to connect the first node to the output node in response to the scan signal from an (N+2)-th one of the plurality of stages, where N is an integer greater than or equal to 1.

In exemplary embodiments, at least one of the fifth transistor and the sixth transistor has a size larger than that of a first transistor included in the first input circuit.

In exemplary embodiments, the second refresh circuit includes an eighth transistor having a gate receiving the first one of the plurality of clock signals, a first terminal coupled to the second node, and a second terminal coupled to the high gate voltage.

In exemplary embodiments, the leakage circuit includes a ninth transistor having a gate coupled to the second node, a first terminal coupled to the second node, and a second terminal coupled to the high gate voltage.

In exemplary embodiments, the ninth transistor has a size larger than that of a second transistor included in the second input circuit.

In exemplary embodiments, the plurality of clock signals include first through fifth clock signals. A first one of the plurality of stages receives the second clock signal, the fourth clock signal, and the scan start pulse that is applied in synchronization with the first clock signal, and outputs a first scan signal in synchronization with the second clock signal. A second one of the plurality of stages receives the third clock signal, the fifth clock signal, and the first scan signal that is applied in synchronization with the second clock signal, and outputs a second scan signal in synchronization with the third clock signal. A third one of the plurality of stages receives the fourth clock signal, the first clock signal, and the second scan signal that is applied in synchronization with the third clock signal, and outputs a third scan signal in synchronization with the fourth clock signal. A fourth one of the plurality of stages receives the fifth clock signal, the second clock signal, and the third scan signal that is applied in synchronization with the fourth clock signal, and outputs a fourth scan signal in synchronization with the fifth clock signal. A fifth one of the plurality of stages receives the first clock signal, the third clock signal, and the fourth scan signal that is applied in synchronization with the fifth clock signal, and outputs a fifth scan signal in synchronization with the first clock signal.

In exemplary embodiments, the plurality of clock signals includes first through fourth clock signals. A first one of the plurality of stages receives the second clock signal, the fourth clock signal, and the scan start pulse that is applied in synchronization with the first clock signal, and outputs a first scan signal in synchronization with the second clock signal. A second one of the plurality of stages receives the third clock signal, the first clock signal, and the first scan signal that is applied in synchronization with the second clock signal, and outputs a second scan signal in synchronization with the third clock signal. A third one of the plurality of stages receives the fourth clock signal, the second clock signal, and the second scan signal that is applied in synchronization with the third clock signal, and outputs a third scan signal in synchronization with the fourth clock signal. A fourth one of the plurality of stages receives the first clock signal, the third clock signal, and the third scan signal that is applied in synchronization with the fourth clock signal, and outputs a fourth scan signal in synchronization with the first clock signal.

According to exemplary embodiments, a scan driver includes a plurality of stages, each of which outputs a scan signal in response to receiving a scan start pulse and a plurality of clock signals. Each stage includes a first transistor having a gate receiving the scan start pulse or the scan signal from a previous stage, a first terminal coupled to a high gate voltage, and a second terminal coupled to a first node, a second transistor having a gate coupled to the first node, a first terminal receiving a first one of the plurality of clock signals, and a second terminal coupled to a second node, a third transistor having a gate coupled to the first node, a first terminal receiving a second one of the plurality of clock signals, and a second terminal coupled to an output node, a first capacitor having a first electrode coupled to the first node, and a second electrode coupled to the output node, a fourth transistor having a gate coupled to the second node, a first terminal coupled to the output node, and a second terminal coupled to a low gate voltage, a second capacitor having a first electrode coupled to the second node and a second electrode coupled to the low gate voltage, a fifth transistor coupled between the first node and the output node, a sixth transistor having a gate receiving the second one of the plurality of clock signals and a second terminal, a seventh transistor having a gate coupled to the second node, a first terminal coupled to the second terminal of the sixth transistor, and a second terminal coupled to the output node, an eighth transistor having a gate receiving the first one of the plurality of clock signals, a first terminal coupled to the second node, and a second terminal coupled to the high gate voltage, and a ninth transistor having a gate coupled to the second node, a first terminal coupled to the second node, and a second terminal coupled to the high gate voltage.

In exemplary embodiments, the first through ninth transistors may be n-type metal-oxide (NMOS) thin-film transistors.

In exemplary embodiments, the ninth transistor may have a size larger than that of the second transistor.

According to exemplary embodiments, a display device includes a display panel including a plurality of pixels, a data driver configured to provide a data signal to the pixels, a scan driver including a plurality of stages, each providing a scan signal to the pixels in response to receiving a scan start pulse and a plurality of clock signals, and a timing controller configured to control the data driver and the scan driver. Each stage includes a first input circuit configured to apply a high gate voltage to a first node in response receiving to the scan start pulse or the scan signal from a previous stage, a second input circuit configured to apply a first one of the plurality of clock signals to a second node in response to a voltage of the first node, a first output circuit configured to output a second one of the plurality of clock signals as the scan signal in response to the voltage of the first node, a second output circuit configured to output a low gate voltage as the scan signal in response to a voltage of the second node, and a leakage circuit coupled to the high gate voltage and configured to provide a current from the high gate voltage to the second node in response to the voltage of the second node having a high level.

As described above, according to exemplary embodiments of the inventive concept, even if threshold voltages of the transistors included in the scan driver are shifted, the scan driver and the display device including the scan driver according to exemplary embodiments may maintain a voltage level of an internal node of the scan driver using the leakage circuit connected to the high gate voltage, thereby preventing an abnormal operation or a malfunction of the scan driver.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
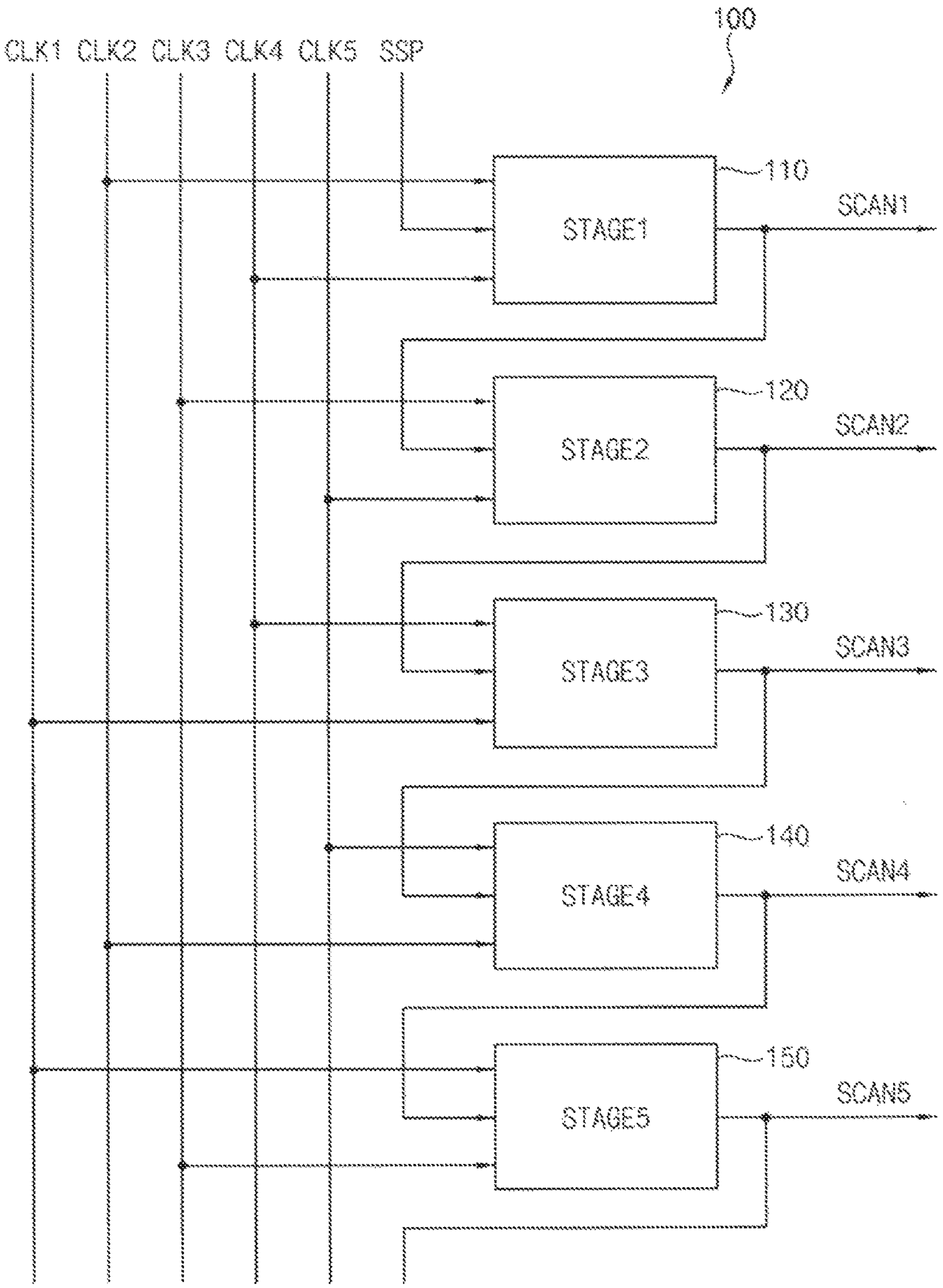
FIG. 1 is a block diagram illustrating a scan driver of a display device according to an exemplary embodiment of the inventive concept.

Exemplary embodiments of the present inventive concept will be described more fully hereinafter with reference to the accompanying drawings. Like reference numerals may refer to like elements throughout the accompanying drawings.

It will be understood that the terms “first,” “second,” “third,” etc. are used herein to distinguish one element from another, and the elements are not limited by these terms. Thus, a “first” element in an exemplary embodiment may be described as a “second” element in another exemplary embodiment.

FIG. 1 is a block diagram illustrating a scan driver of a display device according to an exemplary embodiment of the inventive concept.

Referring to FIG. 1, a scan driver 100 of a display device includes a plurality of stages 110, 120, 130, 140 and 150 that each respectively output a scan signal SCAN1, SCAN2, SCAN3, SCAN4 and SCAN5 in response to a scan start pulse SSP and a plurality of clock signals CLK1, CLK2, CLK3, CLK4 and CLK5.

The scan driver 100 may receive five clock signals. For example, the scan driver 100 may receive first through fifth clock signals CLK1, CLK2, CLK3, CLK4 and CLK5. Each stage 110, 120, 130, 140 and 150 included in the scan driver 100 may receive two clock signals from among the first through fifth clock signals hCLK1, CLK2, CLK3, CLK4 and CLK5. Each stage 110, 120, 130, 140 and 150 may further receive the scan start pulse SSP or the scan signal SCAN1, SCAN2, SCAN3, SCAN4 and SCAN5 applied in synchronization with another clock signal of the first through fifth clock signals CLK1, CLK2, CLK3, CLK4 and CLK5. Each stage 110, 120, 130, 140 and 150 may respectively output the scan signal SCAN1, SCAN2, SCAN3, SCAN4 and SCAN5 in synchronization with one of the two clock signals. For example, a first stage 110 may receive the second clock signal CLK2, the fourth clock signal CLK4, and the scan start pulse SSP that is applied in synchronization with the first clock signal CLK1, and may output a first scan signal SCAN1 in synchronization with the second clock signal CLK2. A second stage 120 may receive the third clock signal CLK3, the fifth clock signal CLK5, and the first scan signal SCAN1 that is applied in synchronization with the second clock signal CLK2, and may output a second scan signal SCAN2 in synchronization with the third clock signal CLK3. A third stage 130 may receive the fourth clock signal CLK4, the first clock signal CLK1, and the second scan signal SCAN2 that is applied in synchronization with the third clock signal CLK3, and may output a third scan signal SCAN3 in synchronization with the fourth clock signal CLK4. A fourth stage 140 may receive the fifth clock signal CLK5, the second clock signal CLK2, and the third scan signal SCAN3 that is applied in synchronization with the fourth clock signal CLK4, and may output a fourth scan signal SCAN4 in synchronization with the fifth clock signal CLK5. A fifth stage 150 may receive the first clock signal CLK1, the third clock signal CLK3, and the fourth scan signal SCAN4 that is applied in synchronization with the fifth clock signal CLK5, and may output a fifth scan signal SCAN5 in synchronization with the first clock signal CLK1. In a similar manner, stages subsequent to the fifth stage 150 may receive the clock signals CLK1, CLK2, CLK3, CLK4 and CLK5 and the scan signals from previous stages, and may output corresponding scan signals.

Hereinafter, an example of a configuration of each stage 110, 120, 130, 140 and 150 will be described with reference to FIG. 2 according to an exemplary embodiment of the inventive concept.

Figure 2:
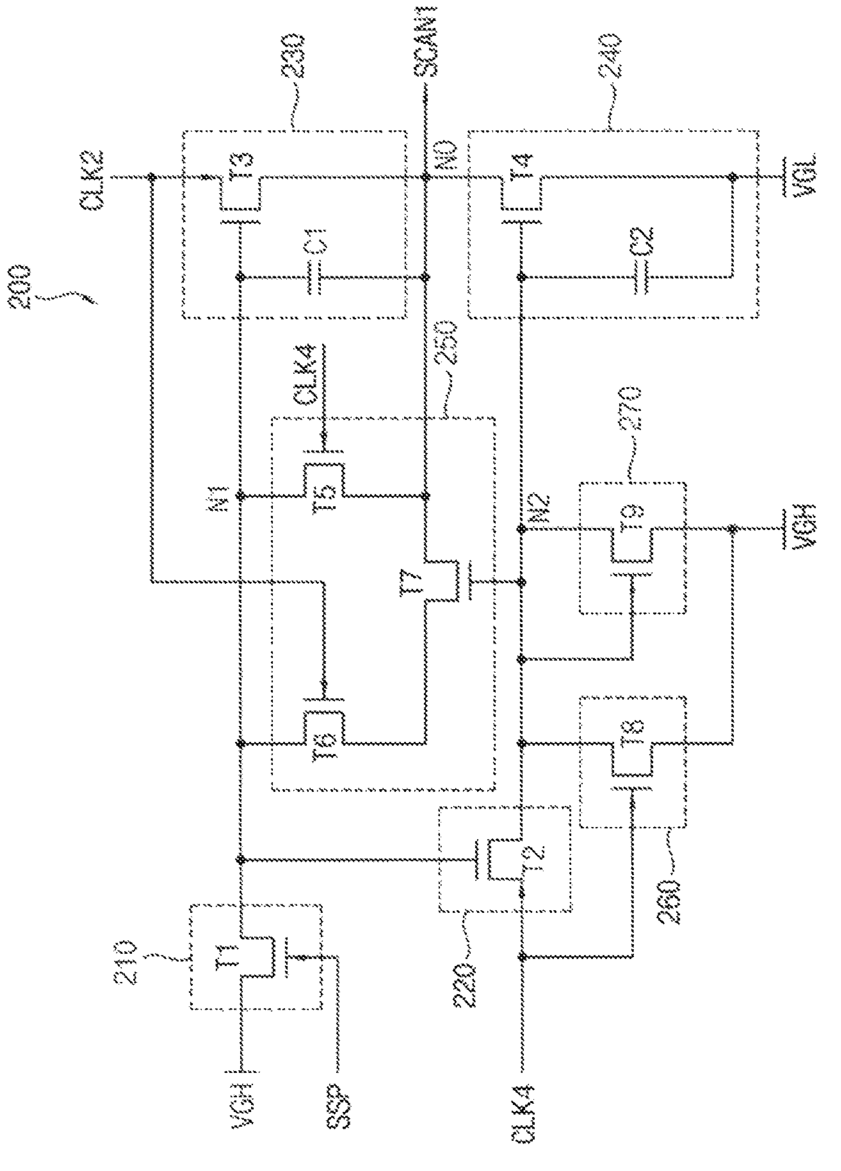
FIG. 2 is a circuit diagram illustrating one of a plurality of stages included in a scan driver according to an exemplary embodiment of the inventive concept.

FIG. 2 is a circuit diagram illustrating one of a plurality of stages included in a scan driver according to an exemplary embodiment of the inventive concept.

Referring to FIG. 2, each stage 200 included in the scan driver 100 may include a first input circuit 210, a second input circuit 220, a first output circuit 230, a second output circuit 240 and a leakage circuit 270. In exemplary embodiments, each stage 200 may further include a first refresh circuit 250 and a second refresh circuit 260. In exemplary embodiments, the first input circuit 210, the second input circuit 220, the first output circuit 230, the second output circuit 240, the first refresh circuit 250, the second refresh circuit 260 and the leakage circuit 270 may each include at least one n-type metal-oxide (NMOS) thin-film transistor (e.g., T1, T2, T3, T4, T5, T6, T7, T8 and T9).

The first input circuit 210 may apply a high gate voltage VGH to a first node N1 in response to the scan start pulse SSP or a scan signal from a previous stage. The first input circuit 210 may include a first transistor T1 having a gate that receives the scan start pulse SSP or the scan signal from the previous stage, a first terminal coupled (e.g., directly coupled) to the high gate voltage VGH (e.g., a first terminal coupled to a node at which the high gate voltage VGH (e.g., referred to as a high gate voltage node) is applied), and a second terminal coupled (e.g., directly coupled) to the first node N1. FIG. 2 illustrates an example of a first stage 110 illustrated in FIG. 1 that receives the scan start pulse SSP. However, the first input circuits 210 of other stages 120, 130, 140 and 150 illustrated in FIG. 1 may receive scan signals SCAN1, SCAN2, SCAN3 and SCAN4 from previous stages instead of the scan start pulse SSP, as described above with reference to FIG. 1.

The second input circuit 220 may apply one clock signal CLK4 from among the plurality of clock signals CLK1, CLK2, CLK3, CLK4 and CLK5 illustrated in FIG. 1 to a second node N2 in response to a voltage of the first node N1. The second input circuit 220 may include a second transistor T2 having a gate coupled (e.g., directly coupled) to the first node N1, a first terminal that receives the one clock signal CLK4, and a second terminal coupled (e.g., directly coupled) to the second node N2. FIG. 2 illustrates an example of the first stage 110 illustrated in FIG. 1 that receives a fourth clock signal CLK4 as the one clock signal. However, other stages 120, 130, 140 and 150 illustrated in FIG. 1 may receive other clock signals CLK5, CLK1, CLK2 and CLK3 as the one clock signal.

The first output circuit 230 may output another clock signal CLK2 from among the plurality of clock signals CLK1, CLK2, CLK3, CLK4 and CLK5 illustrated in FIG. 1 as the scan signal SCAN1 in response to the voltage of the first node N1. Thus, the stage 200 may output the scan signal SCAN1 in synchronization with the another clock signal CLK2. The first output circuit 230 may include a third transistor T3 having a gate coupled (e.g., directly coupled) to the first node N1, a first terminal that receives the another clock signal CLK2 and a second terminal coupled (e.g., directly coupled) to an output node NO, and a first capacitor C1. The first capacitor C1 includes a first electrode coupled (e.g., directly coupled) to the first node N1 and a second electrode coupled (e.g., directly coupled) to the output node N0. FIG. 2 illustrates an example of the first stage 110 illustrated in FIG. 1 that receives a second clock signal CLK2 as the another clock signal. However, other stages 120, 130, 140 and 150 illustrated in FIG. 1 may receive other clock signals CLK3, CLK4, CLK5 and CLK1 as the another clock signal.

The second output circuit 240 may output a low gate voltage VGL as the scan signal SCAN1 in response to a voltage of the second node N2. Thus, after the scan signal SCAN1 is output in synchronization with the another clock signal CLK2, the scan signal SCAN1 may be maintained as a low level (e.g., a voltage level of the low gate voltage VGL or a voltage level close to the voltage level of the low gate voltage VGL). The second output circuit 240 may include a fourth transistor T4 having a gate coupled (e.g., directly coupled) to the second node N2, a first terminal coupled (e.g., directly coupled) to the output node NO and a second terminal coupled (e.g., directly coupled) to the low gate voltage VGL (e.g., a second terminal coupled to a node at which the low gate voltage VGL (e.g., referred to as a low gate voltage node) is applied), and a second capacitor C2. The second capacitor C2 includes a first electrode coupled (e.g., directly coupled) to the second node N2 and a second electrode coupled (e.g., directly coupled) to the low gate voltage VGL (e.g., coupled to the low gate voltage node).

The first refresh circuit 250 may maintain the voltage of the first node N1 as a low level (e.g., a voltage level of the low gate voltage VGL or a voltage level close to the voltage level of the low gate voltage VGL). For example, after the scan signal SCAN1 is output in synchronization with the another clock signal CLK2, the first refresh circuit 250 may periodically discharge the first node N1 to maintain the voltage of the first node N1 as the low level. Accordingly, after the scan signal SCAN1 having a high level is output, the third transistor T3 may be turned off based on the voltage of the first node N1 having the low level, and thus, the scan signal SCAN1 may be maintained as the low level. The first refresh circuit 250 may include a fifth transistor T5 coupled (e.g., directly coupled) between the first node N1 and the output node NO, a sixth transistor T6 having a gate that receives the another clock signal CLK2 and a second terminal, and a seventh transistor T7 having a gate coupled (e.g., directly coupled) to the second node N2, a first terminal coupled (e.g., directly coupled) to the second terminal of the sixth transistor T6, and a second terminal coupled (e.g., directly coupled) to the output node NO. In exemplary embodiments, the fifth transistor T5 may connect the first node N1 to the output node NO in response to the one clock signal CLK4 to discharge the first node N1, as illustrated in FIG. 2. Further, when the another clock signal CLK2 is applied and the voltage of the second node N2 has the high level, the sixth transistor T6 and the seventh transistor T7 may connect the first node N1 to the output node NO to discharge the first node N1.

In exemplary embodiments, at least one of the fifth transistor T5 and the sixth transistor T6 has a size (e.g., a channel width) larger than a size of the first transistor T1 included in the first input circuit 210. For example, the size of each of the fifth transistor T5 and the sixth transistor T6 may be about twice the size of the first transistor T1. Absent a leakage current, after the scan signal SCAN1 having the high level is output, the voltage of the first node N1 should have the low level. However, in a case in which a leakage current is provided from the high gate voltage VGH (e.g. provided from the high gate voltage node) through the first transistor T1 to the first node N1, the voltage of the first node N1 may be increased. For example, the leakage current through the first transistor T1 may be increased by a threshold voltage shift of the first transistor T1. Further, this leakage current may be accumulated while the fifth transistor T5 and the sixth transistor T6 are turned off, thereby negatively affecting an operation of the stage 200. However, in the stage 200 of the scan driver 100 according to exemplary embodiments of the inventive concept, even if the leakage current is provided through the first transistor T1 to the first node N1, the leakage current may be drained through the turned-off fifth and sixth transistors T5 and T6 from the first node N1, and thus, the voltage of the first node N1 may be prevented from being increased. For example, in exemplary embodiments in which the fifth transistor T5 and/or the sixth transistor T6 have a size larger than that of the first transistor T1, the voltage of the first node N1 may be further prevented from being increased.

The second refresh circuit 260 may maintain the voltage of the second node N2 as the high level (e.g., a voltage level of the high gate voltage VGH or a voltage level close to the voltage level of the high gate voltage VGH). For example, after the scan signal SCAN1 is output in synchronization with the another clock signal CLK2, the second refresh circuit 260 may periodically charge the second node N2 to maintain the voltage of the second node N2 as the high level. Accordingly, after the scan signal SCAN1 having the high level is output, the fourth transistor T4 may be turned on based on the voltage of the second node N2 having the high level, and thus, the scan signal SCAN1 may be maintained as the low level (e.g., the voltage level of the low gate voltage VGL or a voltage level close to the voltage level of the low gate voltage VGL). The second refresh circuit 260 may include an eighth transistor T8 having a gate receiving the one clock signal CLK4, a first terminal coupled (e.g., directly coupled) to the second node N2, and a second terminal coupled (e.g., directly coupled) to the high gate voltage VGH (e.g., coupled to the high gate voltage node).

The leakage circuit 270 may be coupled (e.g., directly coupled) to the high gate voltage VGH (e.g., coupled to the high gate voltage node), and may provide a current from the high gate voltage VGH (e.g., a current from the high gate voltage node) to the second node N2 when the voltage of the second node N2 has the high level. Absent a leakage current, after the scan signal SCAN1 having the high level is output, the voltage of the second node N2 should have the high level. However, in a case in which a leakage current leaks from the second node N2 through the second transistor 12 while the one clock signal CLK4 has the low level, the voltage of the second node N2 may be decreased. For example, the leakage current through the second transistor T2 may be increased by a threshold voltage shift of the second transistor T2. However, in the stage 200 of the scan driver according to exemplary embodiments of the inventive concept, even if the leakage current leaks through the second transistor T2 from the second node N2, the leakage circuit 270 may provide the current from the high gate voltage VGH (e.g., the current from the high gate voltage node) to the second node N2, and thus, the voltage of the second node N2 may be prevented from being decreased. For example, the leakage circuit 270 may include a ninth transistor T9 having a gate coupled (e.g., directly coupled) to the second node N2, a first terminal (e.g., a source) coupled (e.g., directly coupled) to the second node N2, and a second terminal (e.g., a drain) coupled (e.g., directly coupled) to the high gate voltage VGH (e.g., the high gate voltage node). Thus, in the stage 200 of the scan driver according to exemplary embodiments of the inventive concept, the current may be provided to the second node N2 through the ninth transistor T9 having the source and the gate coupled (e.g. directly coupled) to the second node N2, and thus, the voltage of the second node N2 may be prevented from being decreased. Accordingly, in the stage 200 of the scan driver according to exemplary embodiments of the inventive concept, even if a threshold voltage shift of the transistors T1, T2, T3, T4, T5, T6, T7, T8 and T9 occurs, an abnormal operation of the stage 200 may be prevented.

In exemplary embodiments, the ninth transistor T9 may have a size (e.g., a channel width) larger than a size of the second transistor T2 included in the second input circuit 220. For example, the size of the ninth transistor T9 may be about twice the size of the second transistor T2. In this case, even if a threshold voltage shift of the transistors T1, T2, T3, T4, T5, T6, T7, T8 and T9 occurs, the current provided through the ninth transistor T9 may be greater than or equal to the leakage current through the second transistor T2. Thus, the negative effect that a threshold voltage shift of the transistors T1, T2, T3, T4, T5, T6, T7, T8 and T9 may have on the stage 200 of the scan driver 100 may be decreased or prevented according to exemplary embodiments of the inventive concept. For example, the stage 200 of the scan driver 100 according to exemplary embodiments may normally operate even if a threshold voltage shift ranging from, for example, about −4 V to about +4 V, occurs.

The first through ninth transistors T1, T2, T3, T4, T5, T6, T7, T8 and T9 may be n-type metal-oxide (NMOS) thin-film transistors. Threshold voltages may be readily shifted by a voltage stress. Thus, in a conventional scan driver including the metal-oxide thin-film transistors, a voltage of an internal node (e.g., the first node N1 or the second node N2) may not be maintained as a desired voltage level due to the threshold voltage shift, and the conventional scan driver may operate abnormally. However, in the stage 200 of the scan driver 100 according to exemplary embodiments of the inventive concept, even if the threshold voltages of the transistors T1, T2, T3, T14, T5, T6, T7, T8 and T9 are shifted, the voltage of the internal node N2 may be maintained as the desired voltage level using the leakage transistor T9 connected to the high gate voltage VGH (e.g., the high gate voltage node), and thus, abnormal operation may be prevented. Further, in exemplary embodiments, the leakage transistor T9 may have a size larger than that of the second transistor T2 included in the second input circuit 220. Thus, the negative effect that a threshold voltage shift of the transistors T1, T2, T3, T4, T5, T6, T7, T8 and T9 may have on the stage 200 may be decreased or prevented according to exemplary embodiments of the inventive concept.

Hereinafter, an example of an operation of each stage 200 will be described with reference to FIGS. 3 and 4A through 4F according to an exemplary embodiment of the inventive concept.

Figure 3:
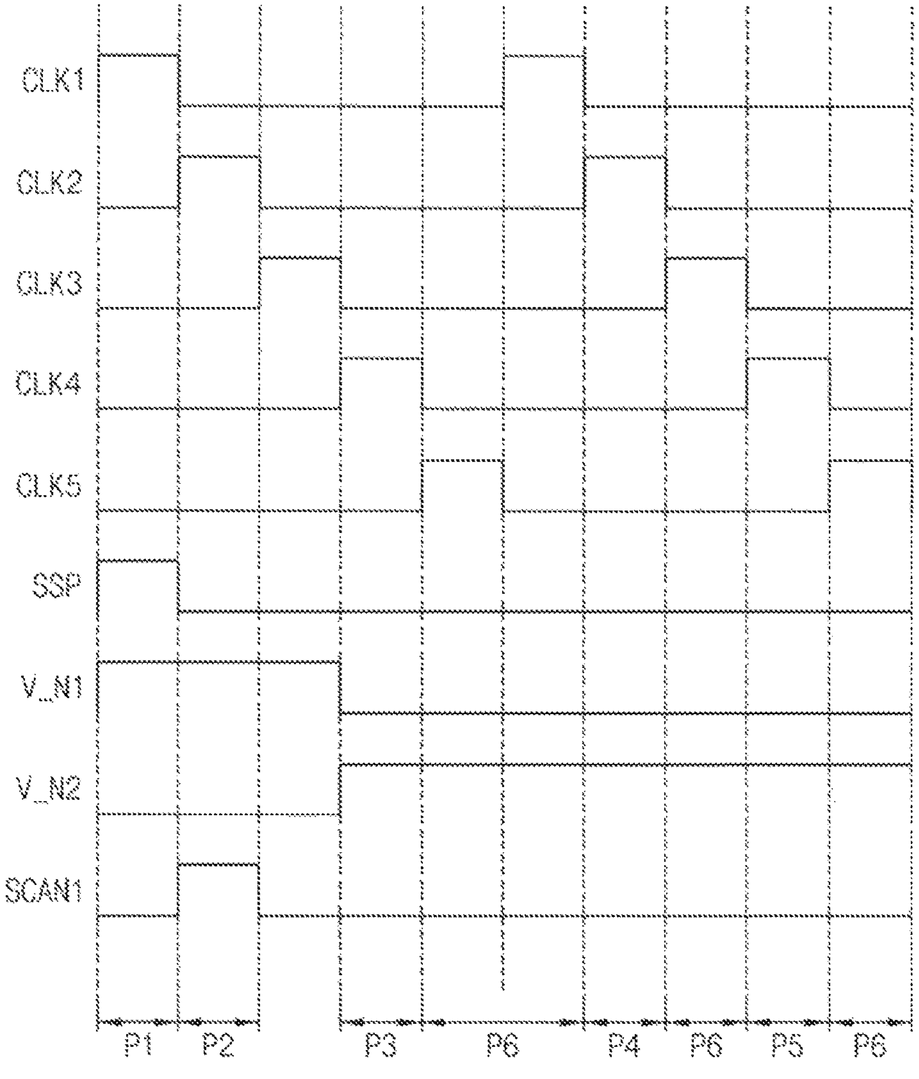
FIG. 3 is a timing diagram illustrating an example of an operation of a stage of FIG. 2 according to an exemplary embodiment of the inventive concept.

FIG. 3 is a timing diagram illustrating an example of an operation of a stage of FIG. 2 according to an exemplary embodiment of the inventive concept. FIGS. 4A through 4F are circuit diagrams illustrating an example of an operation of a stage of FIG. 2 according to an exemplary embodiment of the inventive concept.

Referring to FIGS. 4A through 4F, a circle around a transistor indicates that the transistor is turned on.

Figure 4A:
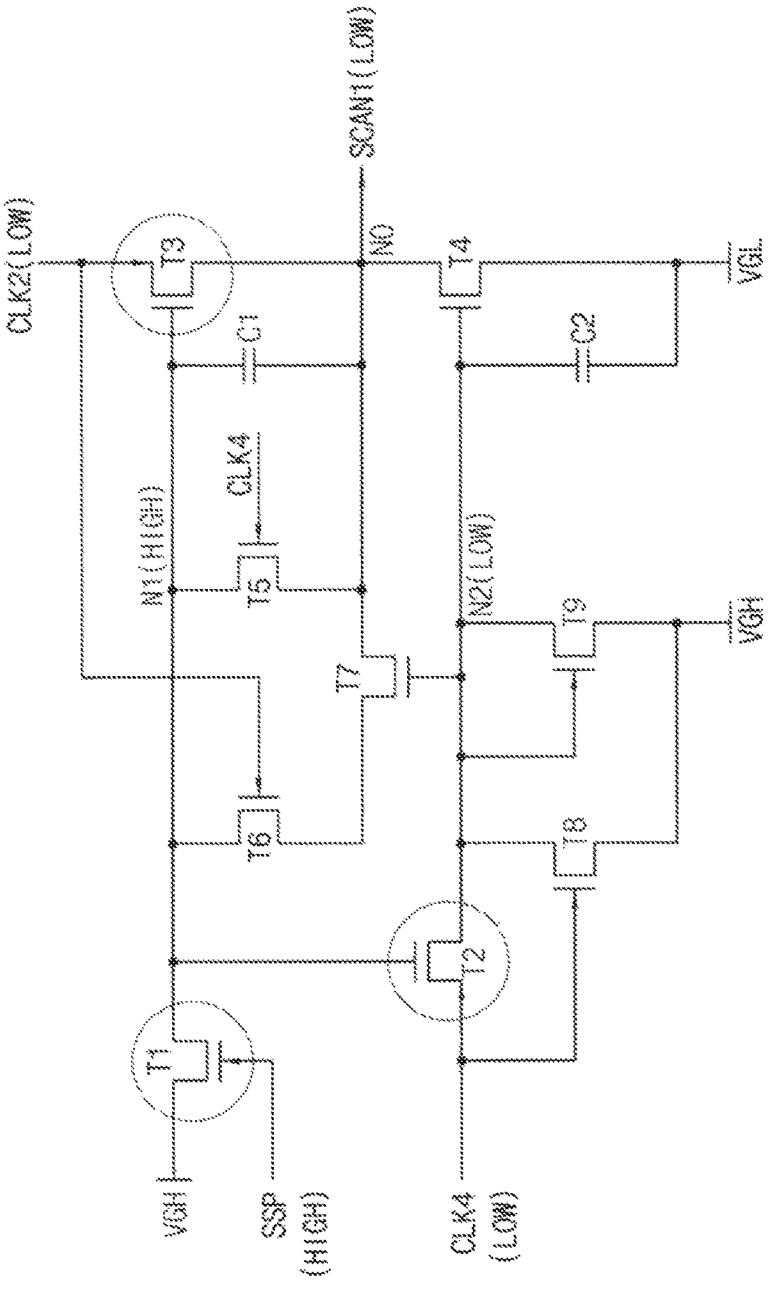
FIGS. 4A through 4F are circuit diagrams illustrating an example of an operation of a stage of FIG. 2 according to an exemplary embodiment of the inventive concept.

Referring to FIGS. 3 and 4A, at a first period P1 when the first clock signal CLK1 has the high level, a stage (e.g., the first stage 110 illustrated in FIG. 1) may receive the scan start pulse SSP that is applied in synchronization with the first clock signal CLK1. The first transistor T1 may be turned on in response to the scan start pulse SSP having the high level, and may apply a high gate voltage VGH to the first node N1. A voltage V_N1 of the first node N1 may have the high level based on the high gate voltage VGH (e.g., based on the first node N1's connection to the high gate voltage node). A second transistor 12 may be turned on in response to the voltage V_N1 of the first node N1 having the high level, and may apply a fourth clock signal CLK4 having the low level to the second node N2. A voltage V_N2 of the second node N2 may have the low level based on the fourth clock signal CLK4 having the low level. The third transistor T3 may be turned on in response to the voltage V_N1 of the first node N1 having the high level, and may output a second clock signal CLK2 having the low level as the scan signal SCAN1.

Figure 4B:
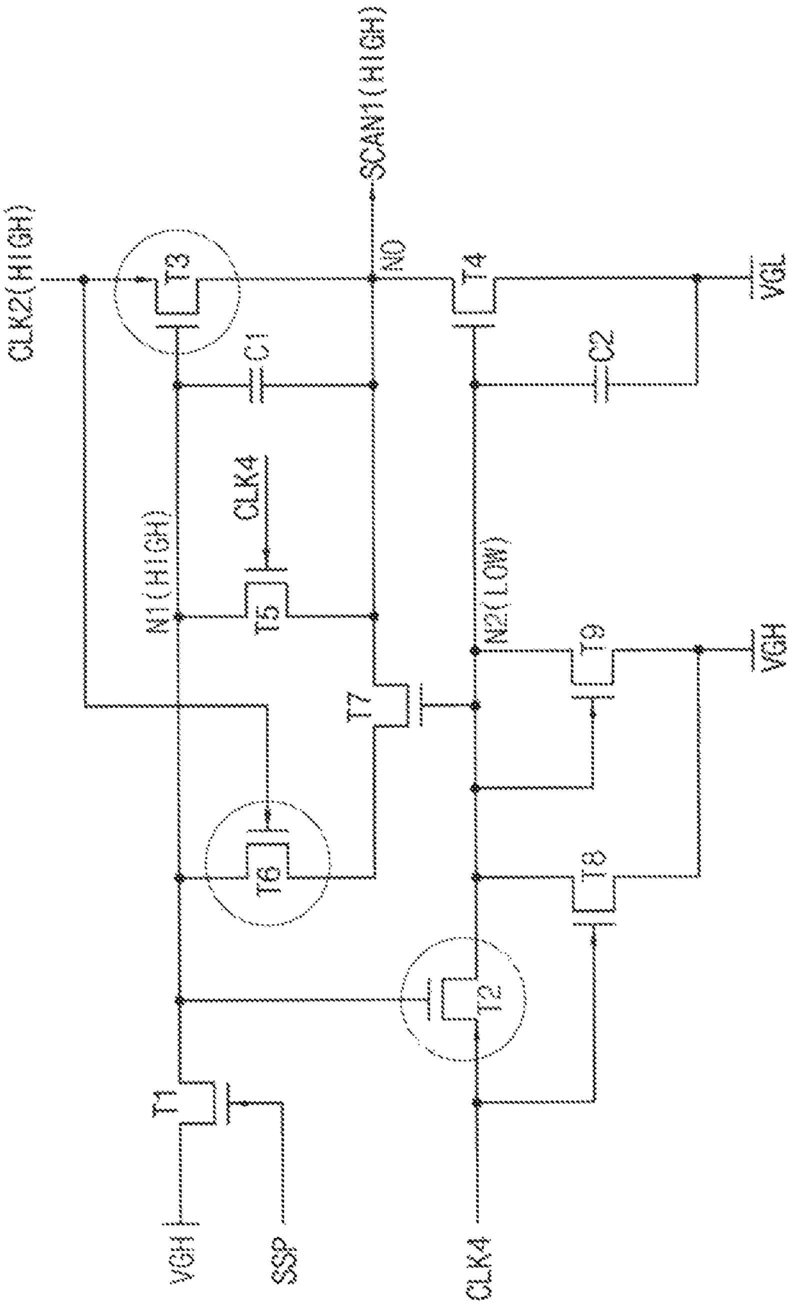

Referring to FIGS. 3 and 4B, at a second period P2 when the second clock signal CLK2 has the high level, the second, third and sixth transistors T2, T3 and T6 may be turned on. The turned-on third transistor T3 may output the second clock signal CLK2 having the high level as the scan signal SCAN1. Thus, the stage (e.g., the first stage 110 illustrated in FIG. 1) may output the scan signal SCAN1 in synchronization with the second clock signal CLK2.

Figure 4C:
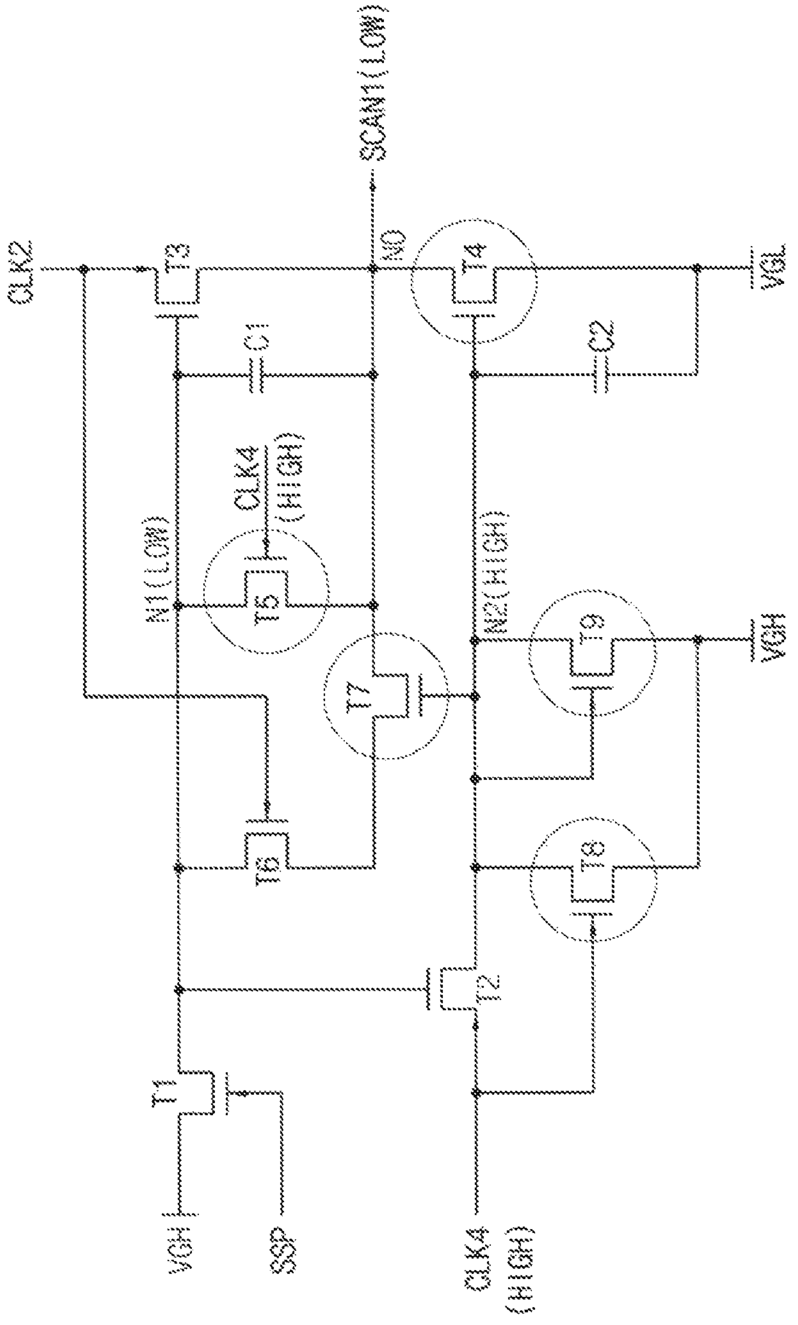

Referring to FIGS. 3 and 4C, at a third period P3 when the fourth clock signal CLK4 has the high level, the fourth, fifth, seventh, eighth and ninth transistors T4, T5, T7, T8 and T9 may be turned on. The eighth transistor T8 may be turned on in response to the fourth clock signal CLK4 having the high level, and may apply the high gate voltage VGH to the second node N2. The voltage V_N2 of the second node N2 may have the high level based on the high gate voltage VGH (e.g., based on the second node N2's connection to the high gate voltage node). The fifth transistor T5 may be turned on in response to the fourth clock signal CLK4 having the high level, and the fourth transistor T4 may be turned on in response to the voltage V_N2 of the second node N2 having the high level. Thus, a low gate voltage VGL may be applied through the turned-on fifth transistor T5 and the turned-on fourth transistor T4 to the first node N1, and the voltage V_N1 of the first node N1 may have the low level based on the low gate voltage VGL (e.g., based on the first node N1's connection to the low gate voltage node). The voltage V_N1 of the first node N1 and the voltage V_N2 of the second node N2 may be maintained as the low level and the high level, respectively. The low gate voltage VGL may further be applied to the output node NO through the fourth transistor T4 that is turned on in response to the voltage V_N2 of the second node N2 having the low level, and thus, the scan signal SCAN1 may be maintained as the low level. To maintain the voltage V_N of the first node N1 and the voltage V_N2 of the second node N2 as the low level and the high level, respectively, the first node N1 and the second node N2 may be periodically discharged and charged, respectively.

Figure 4D:
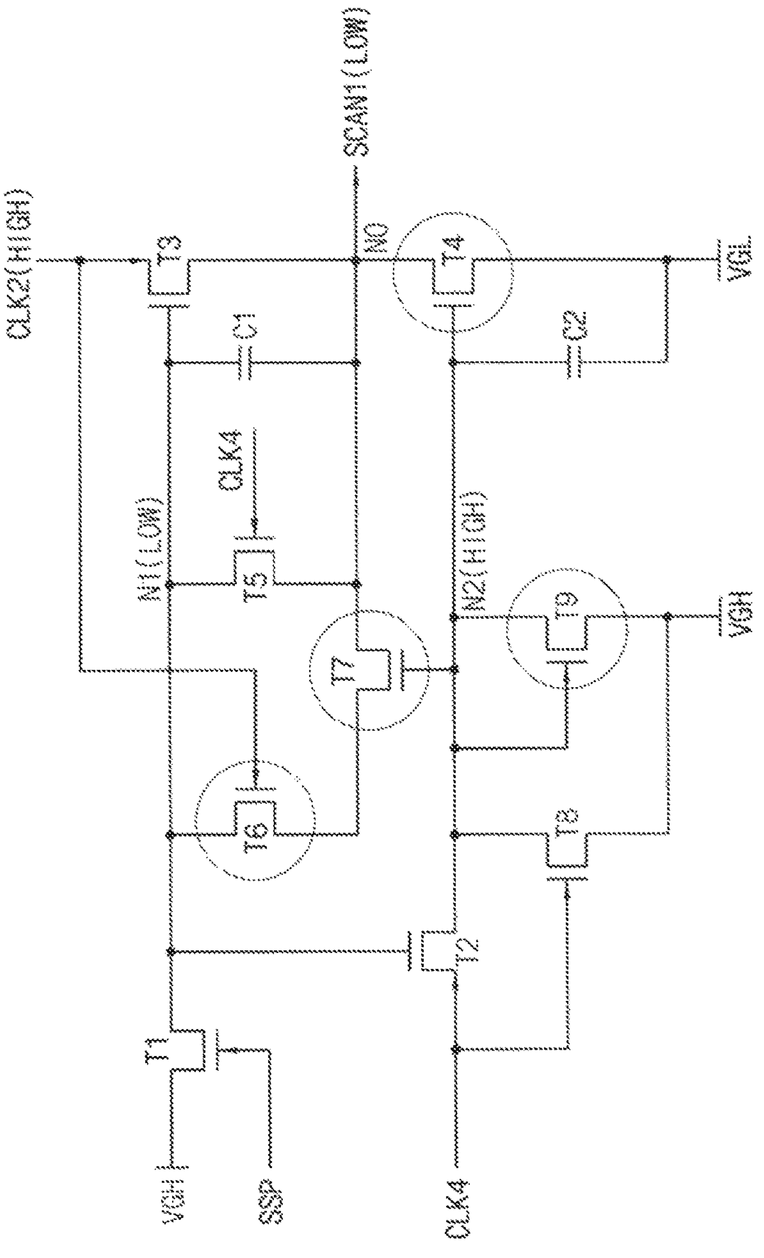

Referring to FIGS. 3 and 4D, at a fourth period P4 when the second clock signal CLK2 has the high level, the fourth, sixth, seventh and ninth transistors T4, T6, T7 and T9 may be turned on. The fourth transistor T4 may be turned on in response to the voltage V_N2 of the second node N2 having the high level, the sixth transistor T6 may be turned on in response to the second clock signal CLK2 having the high level, and the seventh transistor T7 may be turned on in response to the voltage V_N2 of the second node N2 having the high level. Thus, the low gate voltage VGL may be applied to the first node N1 through the turned-on fourth, sixth and seventh transistors T4, T6 and T7. Thus, the first node N1 may be discharged. The first node N1 is periodically discharged when the second clock signal CLK2 has the high level after the scan signal SCAN1 having the high level is output. As a result, the voltage V_N1 of the first node N1 may be maintained as the low level.

Figure 4E:
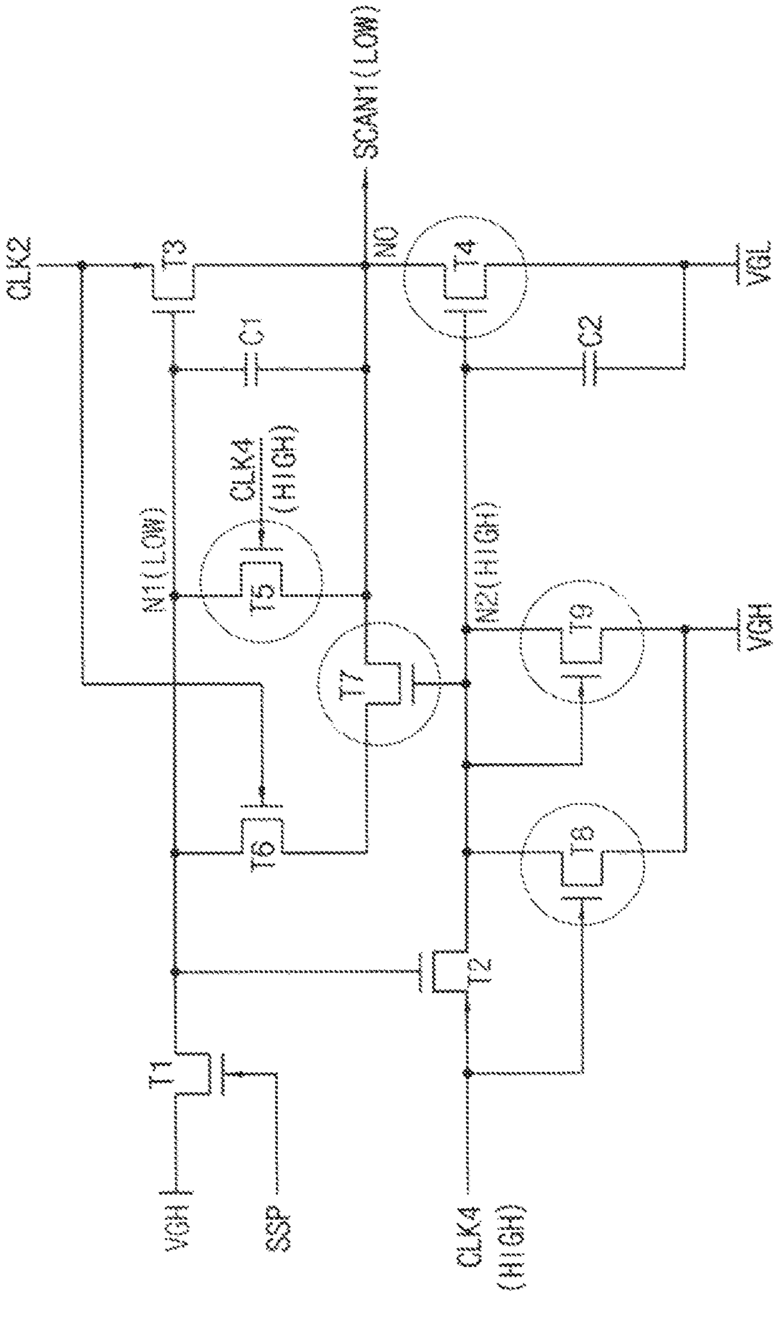

Referring to FIGS. 3 and 4E, at a fifth period P5 when the fourth clock signal CLK4 has the high level after the scan signal SCAN1 having the high level is output, the fourth, fifth, seventh, eighth and ninth transistors T4, T5, T7, T8 and T9 may be turned on. The eighth transistor T8 may be turned on in response to the fourth clock signal CLK4 having the high level. Thus, the high gate voltage VGH may be applied to the second node N2 through the turned-on eighth transistor T8. Thus, the second node N2 may be charged. The second node N2 is periodically discharged when the fourth clock signal CLK4 has the high level after the scan signal SCAN1 having the high level is output. Thus, the voltage V_N2 of the second node N2 may be maintained as the high level. Further, the fourth transistor T4 may be turned on in response to the voltage V_N2 of the second node N2 having the high level, and the fifth transistor T5 may be turned on in response to the fourth clock signal CLK4 having the high level. Thus, the low gate voltage VGL may be applied to the first node N1 through the turned-on fourth and fifth transistors T4 and T5. Thus, the first node N1 may be discharged. After the scan signal SCAN1 having the high level is output, the first node N1 may be discharged when the second clock signal CLK2 having the high level is applied, and also when the fourth clock signal CLK4 having the high level is applied.

Figure 4F:
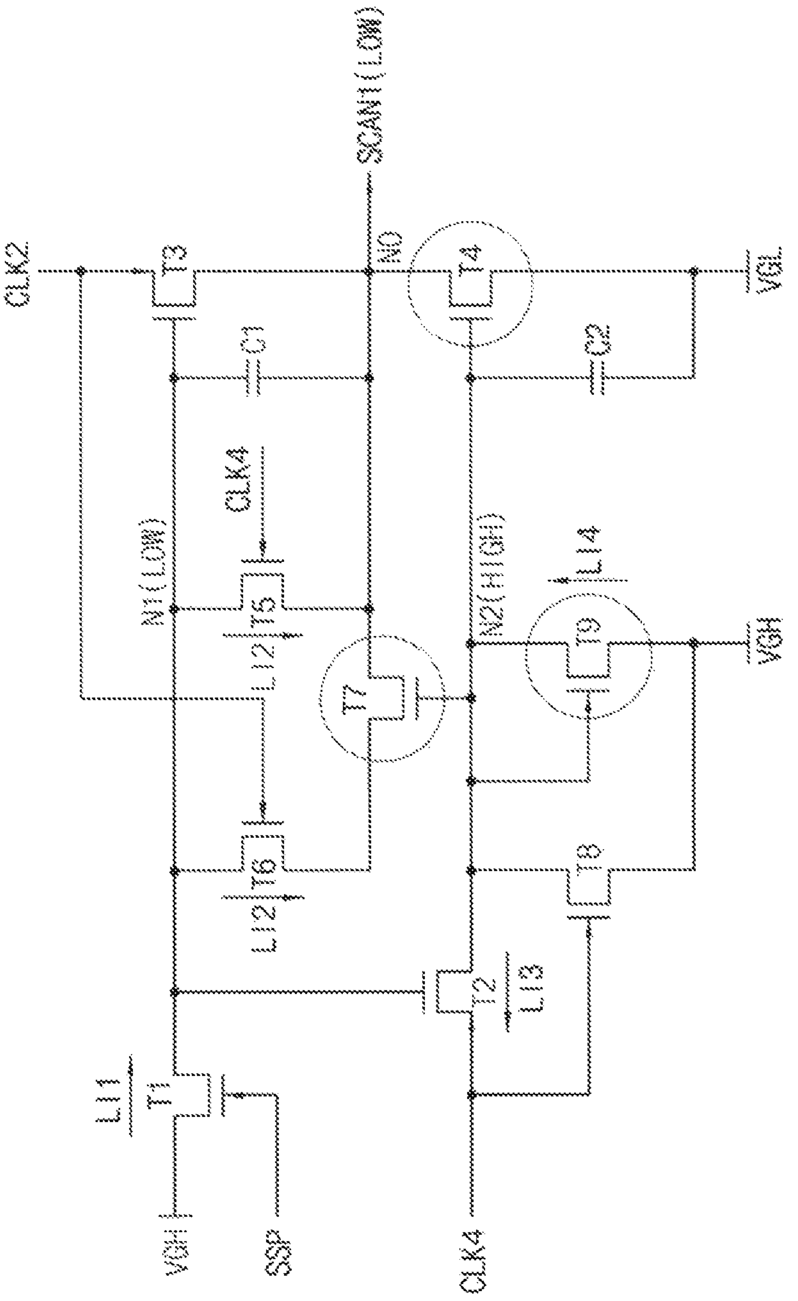

Referring to FIGS. 3 and 4F, at a sixth period P6 when the second and fourth clock signals CLK2 and CLK4 have the low level after the scan signal SCAN1 having the high level is output, the fourth, seventh and ninth transistors T4, T7 and T9 may be turned on. Absent a leakage current, after the scan signal SCAN1 having the high level is output, the voltage V_N1 of the first node N1 should be maintained as the low level. However, a leakage current LI1 may be provided from the high gate voltage VGH (e.g., from the high gate voltage node) through the first transistor T1 to the first node N1, and the voltage V_N1 of the first node N1 may be increased. However, in each stage of the scan driver 100 according to exemplary embodiments of the inventive concept, a leakage current LI2 may be drained through the fifth and sixth transistors T5 and T6 and through the turned-on fourth and seventh transistors T4 and T7, and thus, the voltage V_N of the first node N1 may be maintained as the low level. In exemplary embodiments, at least one of the fifth transistor T5 and the sixth transistor T6 may have a size larger than that of the first transistor T1. Thus, the voltage V_N1 of the first node N1 may be further prevented from being increased. Accordingly, the negative effect that a threshold voltage shift may have on each stage of the scan driver 100 according to exemplary embodiments of the inventive concept may be decreased or prevented. Further, absent a leakage current, after the scan signal SCAN1 having the high level is output, the voltage V_N2 of the second node N2 should be maintained as the high level. However, a leakage current LI3 may leak from the second node N2 through the second transistor T2 while the fourth clock signal CLK4 has the low level. The leakage current LI3 through the second transistor T2 may be increased by the threshold voltage shift of the second transistor T2. However, in each stage of the scan driver 100 according to exemplary embodiments, a current LI4 may be provided through the ninth transistor T9 from the high gate voltage VGH (e.g., from the high gate voltage node) to the second node N2. Thus, the voltage V_N2 of the second node N2 may be maintained as the high level. In exemplary embodiments, the ninth transistor T9 may have a size larger than that of the second transistor T2. Thus, the voltage V_N2 of the second node N2 may be further prevented from being decreased. Accordingly, the negative effect that a threshold voltage shift may have on each stage of the scan driver 100 may be decreased or prevented according to exemplary embodiments of the inventive concept.

As described above, the first node N1 may be periodically discharged at the fourth and fifth periods P4 and P5 when the second clock signal CLK2 or the fourth clock signal CLK4 has the high level, and the second node N2 may be periodically charged at the fifth period P5 when the fourth clock signal CLK4 has the high level. In some cases, a leakage current to the first node N1 may occur during a period between the fourth and fifth periods P4 and P5, and a leakage current from the second node N2 may occur at the fifth period P5. However, in each stage of the scan driver 100 according to exemplary embodiments, the leakage current to the first node N1 may be drained through the fifth and sixth transistors T5 and T6. Further, in each stage of the scan driver 100 according to exemplary embodiments, the current LI4 may be provided to the second node N2 by the ninth transistor T9 having a source and a gate coupled (e.g., directly coupled) to the second node N2 and a drain coupled (e.g., directly coupled) to the high gate voltage VGH (e.g., coupled to the high gate voltage node). Thus, the voltage V_N2 of the second node N2 may be maintained as the high level. Accordingly, an abnormal operation of each stage and the scan driver 100 including the stage may be prevented.

Figure 5:
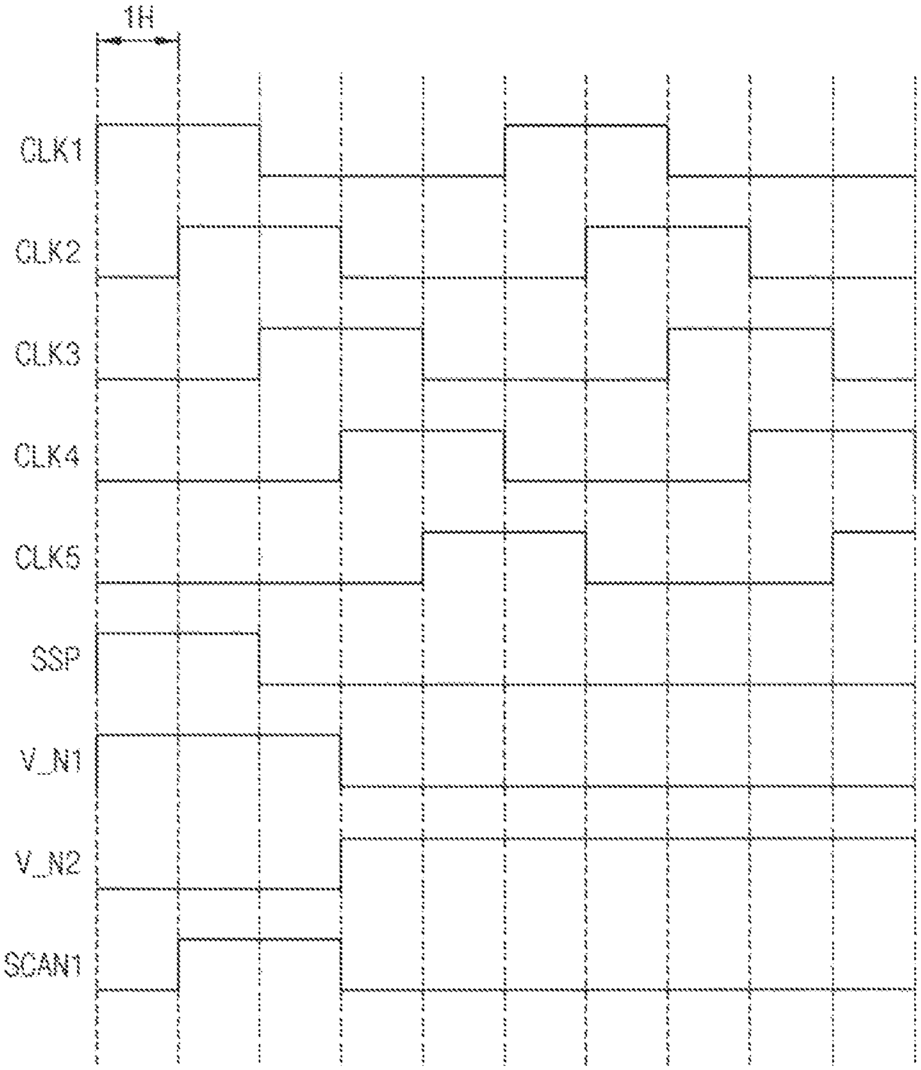
FIG. 5 is a timing diagram illustrating an example of an operation of a scan driver according to an exemplary embodiment of the inventive concept.

FIG. 5 is a timing diagram illustrating an example of an operation of a scan driver according to an exemplary embodiment of the inventive concept.

Referring to FIG. 5, the scan driver 100 may receive first through fifth clock signals CLK1, CLK2, CLK3, CLK4 and CLK5, each having a pulse width of 2 H (2 horizontal periods). High level periods of two adjacent clock signals of the first through fifth clock signals CLK1, CLK2, CLK3, CLK4 and CLK5 may partially overlap each other. However, two clock signals (e.g., second and fourth clock signals CLK2 and CLK4) applied to each stage (e.g., the first stage 110 illustrated in FIG. 1) do not overlap each other. For example, two clock signals applied to the same stage do not overlap each other. Thus, although the high level periods of two adjacent clock signals overlap each other as illustrated in FIG. 5, each stage may perform an operation substantially the same as the operation described above with reference to FIGS. 3 through 4F. The operation of the scan driver 100 when the clock signals do not overlap as illustrated in FIG. 3 may be referred to as a 'non-overlap operation', and the operation of the scan driver 100 when the clock signals overlap as illustrated in FIG. 5 may be referred to as an 'overlap operation'. The scan driver 100 according to exemplary embodiments may be capable of performing both the non-overlap operation and the overlap operation. In exemplary embodiments, the scan driver 100 may perform the overlap operation during a data writing operation in which a length of 1 H is relatively short, and may perform the non-overlap operation during a degradation sensing operation in which a length of 1 H is relatively long.

Figure 6:
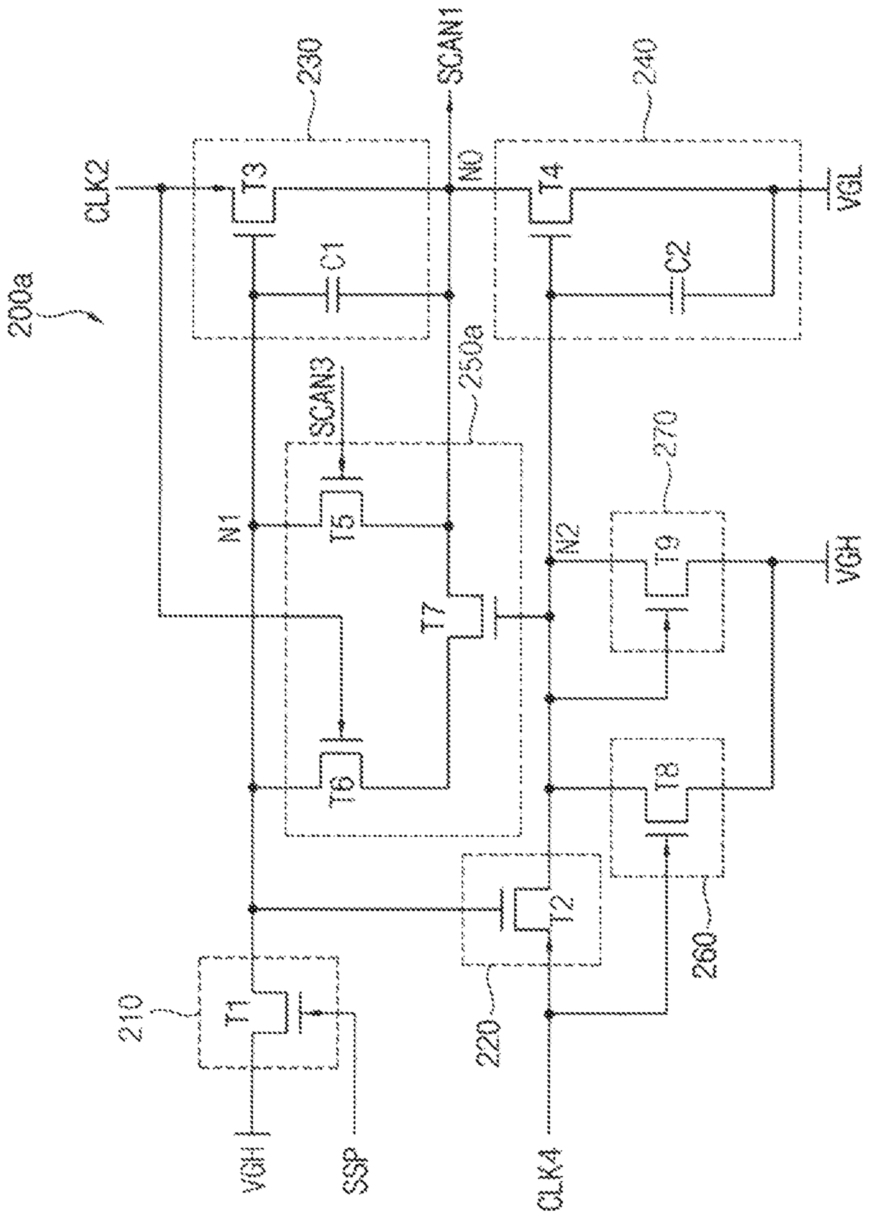
FIG. 6 is a circuit diagram illustrating one of a plurality of stages included in a scan driver according to an exemplary embodiment of the inventive concept.

FIG. 6 is a circuit diagram illustrating one of a plurality of stages included in a scan driver according to an exemplary embodiment of the inventive concept.

Referring to FIG. 6, each stage 200*a* included in the scan driver 100 may include the first input circuit 210, the second input circuit 220, the first output circuit 230, the second output circuit 240, the first refresh circuit 250*a*, the second refresh circuit 260 and the leakage circuit 270 described in detail with reference to FIG. 2. The stage 200*a* of FIG. 6 may have a configuration substantially the same as that of the stage 200 of FIG. 2, except for a signal applied to the gate of the fifth transistor T5.

The fifth transistor T5 included in an N-th stage included in the scan driver 100 may connect the first node N1 to the output node NO in response to a scan signal from an (N+2)-th stage included in the scan driver 100, where N is an integer greater than or equal to 1. For example, the gate of the fifth transistor T5 included in the first stage 110 illustrated in FIG. 1 may receive the scan signal SCAN3 from the third stage 130 illustrated in FIG. 1. The stage 200*a* (e.g., the first stage 110 illustrated in FIG. 1) may output the scan signal SCAN1 in synchronization with the second clock signal CLK2. Subsequently, when the fifth transistor T5 is turned on in response to the fifth transistor T5 applied in synchronization with the fourth clock signal CLK4, a voltage of the first node N1 may become a low level. The stage 200*a* of FIG. 6 may perform an operation substantially the same as that of the stage 200 of FIG. 2, except that referring to the stage 200 of FIG. 2, after the scan signal SCAN1 is output, the first node N1 of the stage 200 may be discharged when the second clock signal CLK2 or the fourth clock signal CLK4 has a high level, and referring to the stage 200*a* of FIG. 6, the first node N1 of the stage 200*a* may be discharged when the second clock signal CLK2 has a high level.

Figure 7:
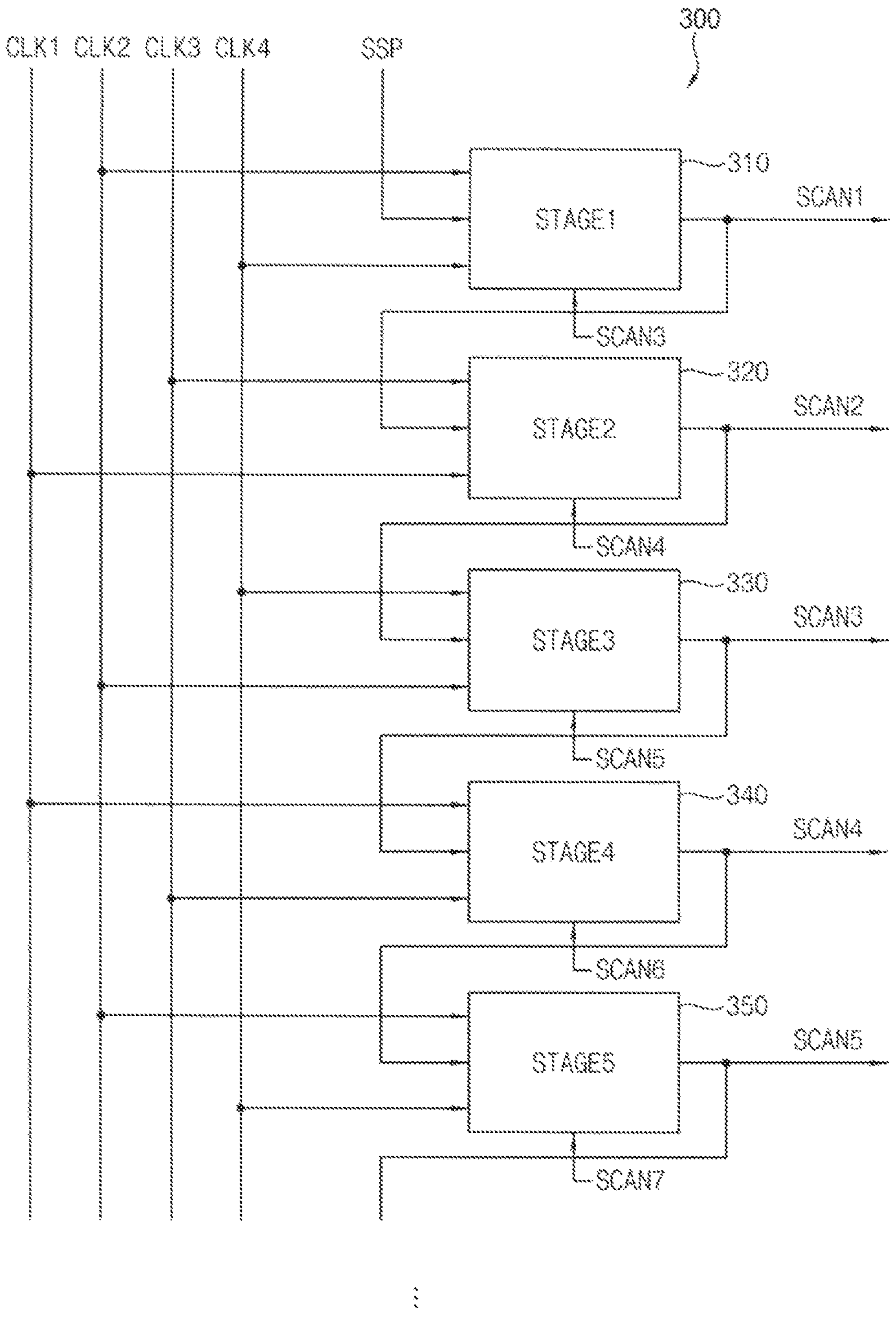
FIG. 7 is a block diagram illustrating a scan driver of a display device according to an exemplary embodiment of the inventive concept.
Figure 8:
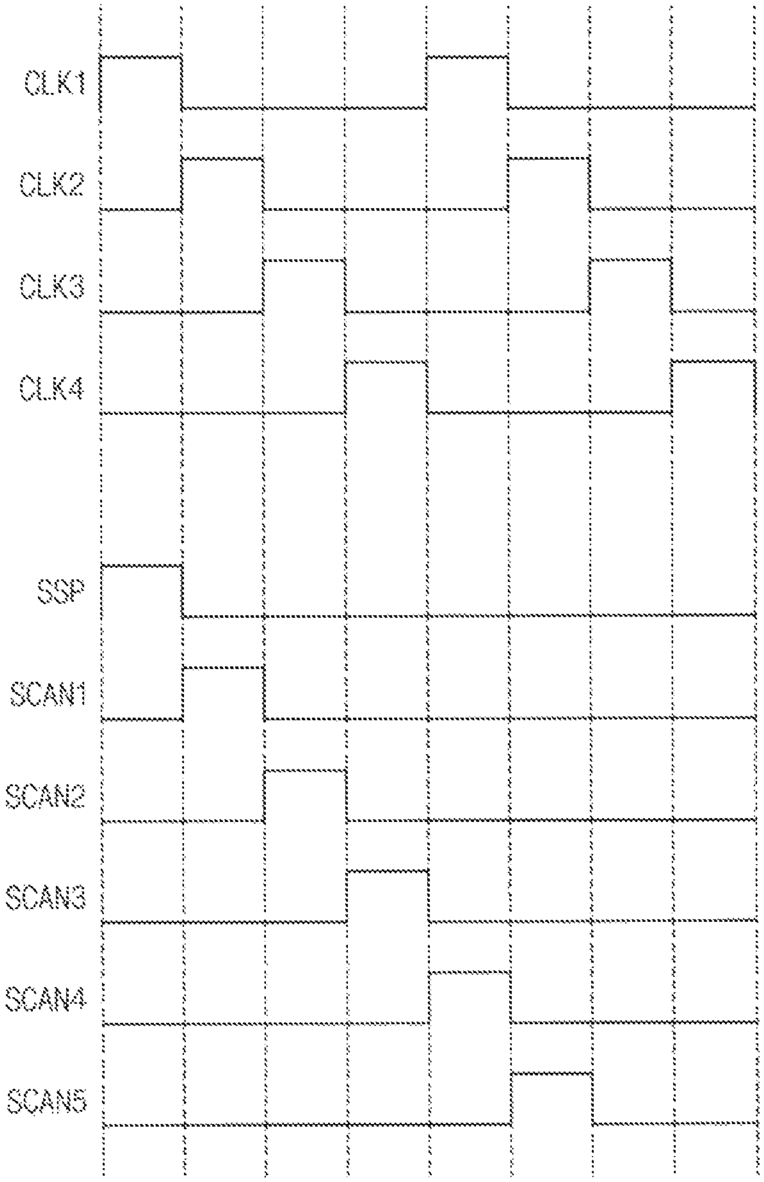
FIG. 8 is a timing diagram illustrating an example of an operation of the scan driver of FIG. 7 according to an exemplary embodiment of the inventive concept.

FIG. 7 is a block diagram illustrating a scan driver of a display device according to an exemplary embodiment of the inventive concept. FIG. 8 is a timing diagram illustrating an example of an operation of the scan driver of FIG. 7 according to an exemplary embodiment of the inventive concept.

Referring to FIG. 7, a scan driver 300 of a display device includes a plurality of stages 310, 320, 330, 340 and 350 that each respectively output a scan signal SCAN1, SCAN2, SCAN3, SCAN4 and SCAN5 in response to a scan start pulse SSP and a plurality of clock signals CLK1, CLK2, CLK3 and CLK4. Unlike the scan driver 100 of FIG. 1 which receives five clock signals CLK1, CLK2, CLK3, CLK4 and CLK5, the scan driver 300 of FIG. 7 may receive four clock signals CLK1, CLK2, CLK3 and CLK4.

The scan driver 300 may receive first through fourth clock signals CLK1, CLK2, CLK3 and CLK4. Each stage 310, 320, 330, 340 and 350 included in the scan driver 300 may receive two clock signals from among the first through fourth clock signals CLK1, CLK2, CLK3 and CLK4, may further receive the scan start pulse SSP or the scan signal SCAN1, SCAN2, SCAN3, SCAN4 and SCAN5 applied in synchronization with another clock signal of the first through fourth clock signals CLK1, CLK2, CLK3 and CLK4, and may output the scan signal SCAN1, SCAN2, SCAN3, SCAN4 and SCAN5 in synchronization with one of the two clock signals.

For example, referring to FIGS. 7 and 8, the first stage 310 may receive the second clock signal CLK2, the fourth clock signal CLK4, and the scan start pulse SSP that is applied in synchronization with the first clock signal CLK1, and may output a first scan signal SCAN1 in synchronization with the second clock signal CLK2. The second stage 320 may receive the third clock signal CLK3, the first clock signal CLK1, and the first scan signal SCAN1 that is applied in synchronization with the second clock signal CLK2, and may output a second scan signal SCAN2 in synchronization with the third clock signal CLK3. The third stage 330 may receive the fourth clock signal CLK4, the second clock signal CLK2, and the second scan signal SCAN2 that is applied in synchronization with the third clock signal CLK3, and may output a third scan signal SCAN3 in synchronization with the fourth clock signal CLK4. The fourth stage 340 may receive the first clock signal CLK1, the third clock signal CLK3, and the third scan signal SCAN3 that is applied in synchronization with the fourth clock signal CLK4, and may output a fourth scan signal SCAN4 in synchronization with the first clock signal CLK1. Similarly to the first stage 310, the fifth stage 350 may receive the second clock signal CLK2, the fourth clock signal CLK4, and the fourth scan signal SCAN4 that is applied in synchronization with the first clock signal CLK1, and may output a fifth scan signal SCAN5 in synchronization with the second clock signal CLK2. In a similar manner, stages subsequent to the fifth stage 350 may receive the clock signals CLK1, CLK2, CLK3 and CLK4 and the scan signals from previous stages, and may output corresponding scan signals.

In exemplary embodiments, each stage 310, 320, 330, 340 and 350 may have a configuration substantially the same as the configuration of the stage 200*a* illustrated in FIG. 6. As illustrated in FIG. 6, each stage 310, 320, 330, 340 and 350 may include the first input circuit 210, the second input circuit 220, the first output circuit 230, the second output circuit 240, the first refresh circuit 250*a*, the second refresh circuit 260 and the leakage circuit 270. The fifth transistor T5 included in the N-th stage (e.g., the first stage 310) may connect the first node N1 to the output node NO in response to a scan signal from an (N+2)-th stage (e.g., the third stage 330).

Figure 9:
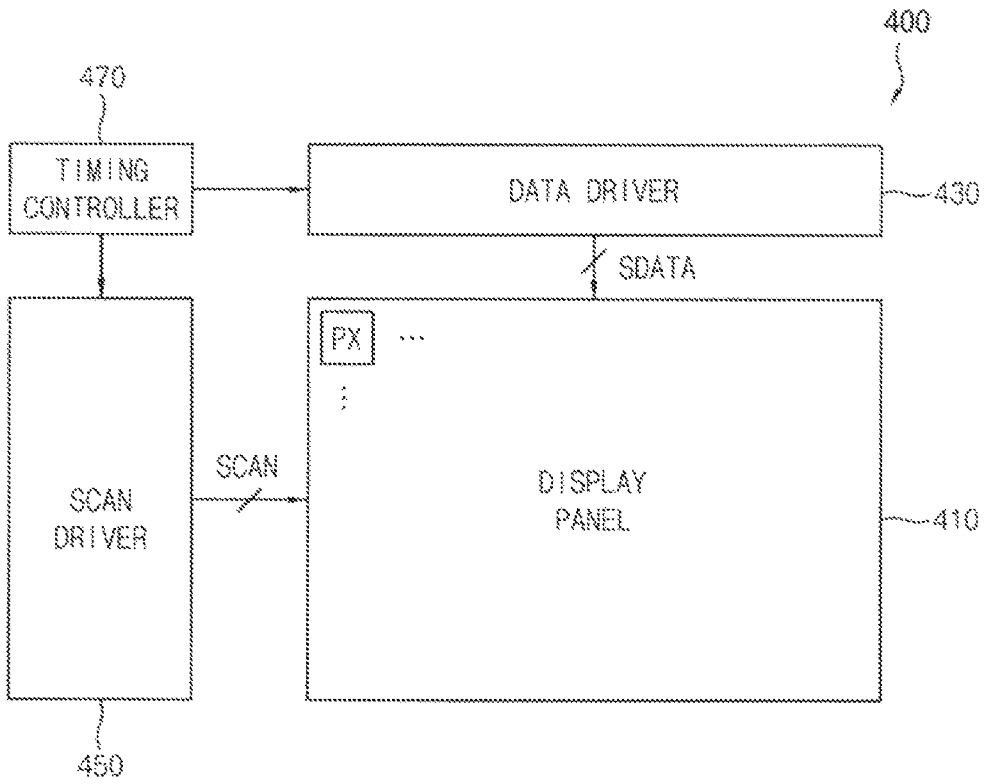
FIG. 9 is a block diagram illustrating a display device including a scan driver according to exemplary embodiments of the inventive concept.

FIG. 9 is a block diagram illustrating a display device including a scan driver according exemplary embodiments of the inventive concept.

Referring to FIG. 9, a display device 400 according to an exemplary embodiment may include a display panel 410 including a plurality of pixels PX, a data driver 430 that provides a data signal SDATA to the pixels PX, a scan driver 450 that includes a plurality of stages that provide a scan signal SCAN to the pixels PX in response to a scan start pulse and a plurality of clock signals, and a timing controller 470 that controls the data driver 430 and the scan driver 450.

In exemplary embodiments, the scan driver 450 may be an embedded scan driver implemented by directly forming thin-film transistors (TFTs) on a substrate of the display panel 410 during a TFT manufacturing process. Further, in exemplary embodiments, the scan driver 450 may be implemented by forming metal-oxide TFTs on the substrate of the display panel 410.

Each stage of the scan driver 450 may include a first input circuit, a second input circuit, a first output circuit, a second output circuit and a leakage transistor (leakage circuit)

having a source and a gate coupled (e.g., directly coupled) to a second node and a drain coupled (e.g., directly coupled) to a high gate voltage (e.g., a high gate voltage node), as described above. The leakage transistor may provide a current from the high gate voltage (e.g., from the high gate voltage node) to the second node when the second node has a high level. Accordingly, even if threshold voltages of transistors of each stage are shifted, a voltage of the second node may be maintained as the high level by the leakage transistor, and an abnormal operation of the scan driver 450 may be prevented.

Figure 10:
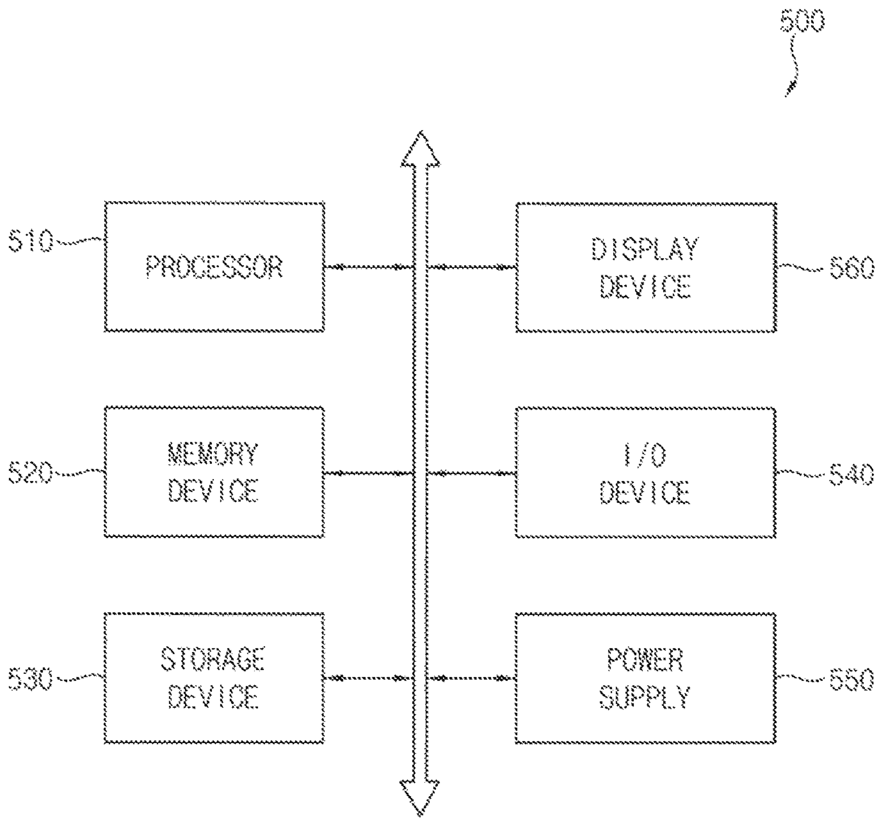
FIG. 10 is a block diagram illustrating an electronic device including a display device according to exemplary embodiments of the inventive concept.

FIG. 10 is a block diagram illustrating an electronic device including a display device according to exemplary embodiments of the inventive concept.

Referring to FIG. 10, an electronic device 500 may include a processor 510, a memory device 520, a storage device 530, an input/output (I/O) device 540, a power supply 550, and a display device 560. The electronic device 500 may further include a plurality of ports for communicating with, for example, a video card, a sound card, a memory card, a universal serial bus (USB) device, other electronic devices, etc.

The processor 510 may perform various computing functions. The processor 510 may be, for example, a microprocessor, a central processing unit (CPU), an application processor (AP), etc. The processor 510 may be coupled to other components via, for example, an address bus, a control bus, a data bus, etc. Further, the processor 510 may be coupled to an extended bus such as, for example, a peripheral component interconnection (PCI) bus.

The memory device 520 may store data for operations of the electronic device 500. The memory device 520 may include, for example, at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc.

The storage device 530 may be, for example, a solid state drive (SSD) device, a hard disk drive (HDD) device, a CD-ROM device, etc. The I/O device 540 may be, for example, an input device such as a keyboard, a keypad, a mouse device, a touchpad, a touch-screen, a remote controller, etc., and an output device such as a printer, a speaker, etc. The power supply 550 may provide power for operations of the electronic device 500.

In exemplary embodiments, the display device 560 may be, for example, an organic light emitting diode (OLED) display device, a liquid crystal display (LCD) device, etc. Each stage included in a scan driver of the display device 560 may include a leakage transistor (a leakage circuit) having a source and a gate coupled (e.g., directly coupled) to a second node and a drain coupled (e.g., directly coupled) to a high gate voltage (e.g., a high gate voltage node), as described above. The leakage transistor may provide a current from the high gate voltage (e.g., from the high gate voltage node) to the second node when the second node has a high level. Accordingly, even if threshold voltages of transistors of each stage are shifted, a voltage of the second node may be maintained as the high level by the leakage transistor, and an abnormal operation of the scan driver may be prevented.

According to exemplary embodiments, the electronic device 500 may be any electronic device including the display device 560 such as, for example, a cellular phone, a smartphone, a tablet computer, a wearable device, a personal digital assistant (PDA), a portable multimedia player (PMP), a digital camera, a music player, a portable game console, a navigation system, a digital television, a 3D television, a personal computer (PC), a home appliance, a laptop computer, etc.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A scan driver comprising a plurality of stages, wherein each stage outputs a scan signal in response to receiving a scan start pulse and a plurality of clock signals, and each stage comprises:

a first input circuit configured to apply a high gate voltage to a first node in response to receiving the scan start pulse, or the scan signal from a previous stage;

a second input circuit configured to apply a first one of the plurality of clock signals to a second node in response to a voltage of the first node;

a first output circuit configured to output a second one of the plurality of clock signals as the scan signal in response to the voltage of the first node;

a second output circuit configured to output a low gate voltage as the scan signal in response to a voltage of the second node; and a leakage circuit coupled to the high gate voltage, and configured to provide a current from the high gate voltage to the second node in response to the voltage of the second node having a high level, wherein the leakage circuit comprises a transistor comprising a gate coupled to the second node, a first terminal coupled to the second node, and a second terminal coupled to the high gate voltage.

2. The scan driver of claim 1, wherein the first input circuit, the second input circuit, the first output circuit, the second output circuit, and the leakage circuit each comprise at least one n-type metal-oxide (NMOS) thin-film transistor.

3. The scan driver of claim 1, wherein the first input circuit comprises:

a transistor comprising a gate that receives the scan start pulse or the scan signal from the previous stage, a first terminal coupled to the high gate voltage, and a second terminal coupled to the first node.

4. The scan driver of claim 1, wherein the second input circuit comprises:

a transistor comprising a gate coupled to the first node, a first terminal that receives the first one of the plurality of clock signals, and a second terminal coupled to the second node.

5. The scan driver of claim 1, wherein the first output circuit includes:

a transistor having a gate coupled to the first node, a first terminal that receives the second one of the plurality of clock signals, and a second terminal coupled to an output node; and a capacitor comprising a first electrode coupled to the first node, and a second electrode coupled to the output node.

6. The scan driver of claim 1, wherein the second output circuit comprises:

a transistor comprising a gate coupled to the second node, a first terminal coupled to an output node, and a second terminal coupled to the low gate voltage; and a capacitor comprising a first electrode coupled to the second node, and a second electrode coupled to the low gate voltage.

7. The scan driver of claim 1, wherein each stage further comprises:

a first refresh circuit configured to maintain the voltage of the first node as a low level; and a second refresh circuit configured to maintain the voltage of the second node as the high level.

8. The scan driver of claim 7, wherein the first refresh circuit comprises:

a first transistor coupled between the first node and an output node;

a second transistor comprising a gate that receives the second one of the plurality of clock signals, and a terminal; and a third transistor comprising a gate coupled to the second node, a first terminal coupled to the terminal of the second transistor, and a second terminal coupled to the output node.

9. The scan driver of claim 8, wherein the first transistor is configured to connect the first node to the output node in response to the first one of the plurality of clock signals.

10. The scan driver of claim 8, wherein the first transistor included in an N-th one of the plurality of stages is configured to connect the first node to the output node in response to the scan signal from an (N+2)-th one of the plurality of stages, where N is an integer greater than or equal to 1.

11. The scan driver of claim 8, wherein a size of at least one of the first transistor and the second transistor is larger than a size of a transistor included in the first input circuit.

12. The scan driver of claim 7, wherein the second refresh circuit comprises:

a transistor comprising a gate that receives the first one of the plurality of clock signals, a first terminal coupled to the second node, and a second terminal coupled to the high gate voltage.

13. The scan driver of claim 1, wherein a size of the transistor included in the leakage circuit is larger than a size of a transistor included in the second input circuit.

14. The scan driver of claim 1, wherein the plurality of clock signals comprises first through fifth clock signals, wherein a first one of the plurality of stages receives the second clock signal, the fourth clock signal, and the scan start pulse that is applied in synchronization with the first clock signal, and outputs a first scan signal in synchronization with the second clock signal, wherein a second one of the plurality of stages receives the third clock signal, the fifth clock signal, and the first scan signal that is applied in synchronization with the second clock signal, and outputs a second scan signal in synchronization with the third clock signal, wherein a third one of the plurality of stages receives the fourth clock signal, the first clock signal, and the second scan signal that is applied in synchronization with the third clock signal, and outputs a third scan signal in synchronization with the fourth clock signal, wherein a fourth one of the plurality of stages receives the fifth clock signal, the second clock signal, and the third scan signal that is applied in synchronization with the fourth clock signal, and outputs a fourth scan signal in synchronization with the fifth clock signal, and wherein a fifth one of the plurality of stages receives the first clock signal, the third clock signal, and the fourth scan signal that is applied in synchronization with the fifth clock signal, and outputs a fifth scan signal in synchronization with the first clock signal.

15. The scan driver of claim 1, wherein the plurality of clock signals comprises first through fourth clock signals, wherein a first one of the plurality of stages receives the second clock signal, the fourth clock signal, and the scan start pulse that is applied in synchronization with the first clock signal, and outputs a first scan signal in synchronization with the second clock signal, wherein a second one of the plurality of stages receives the third clock signal, the first clock signal, and the first scan signal that is applied in synchronization with the second clock signal, and outputs a second scan signal in synchronization with the third clock signal, wherein a third one of the plurality of stages receives the fourth clock signal, the second clock signal, and the second scan signal that is applied in synchronization with the third clock signal, and outputs a third scan signal in synchronization with the fourth clock signal, and wherein a fourth one of the plurality of stages receives the first clock signal, the third clock signal, and the third scan signal that is applied in synchronization with the fourth clock signal, and outputs a fourth scan signal in synchronization with the first clock signal.

16. A scan driver comprising a plurality of stages, wherein each stage outputs a scan signal in response to receiving a scan start pulse and a plurality of clock signals, and each stage comprises:

a first transistor comprising a gate that receives the scan start pulse, or the scan signal from a previous stage, and further comprising a first terminal coupled to a high gate voltage, and a second terminal coupled to a first node;

a second transistor comprising a gate coupled to the first node, a first terminal that receives a first one of the plurality of clock signals, and a second terminal coupled to a second node;

a third transistor comprising a gate coupled to the first node, a first terminal that receives a second one of the plurality of clock signals, and a second terminal coupled to an output node;

a first capacitor comprising a first electrode coupled to the first node, and a second electrode coupled to the output node;

a fourth transistor comprising a gate coupled to the second node, a first terminal coupled to the output node, and a second terminal coupled to a low gate voltage;

a second capacitor comprising a first electrode coupled to the second node, and a second electrode coupled to the low gate voltage;

a fifth transistor coupled between the first node and the output node;

a sixth transistor comprising a gate that receives the second one of the plurality of clock signals, and a second terminal;

a seventh transistor comprising a gate coupled to the second node, a first terminal coupled to the second terminal of the sixth transistor, and a second terminal coupled to the output node;

an eighth transistor comprising a gate that receives the first one of the plurality of clock signals, a first terminal coupled to the second node, and a second terminal coupled to the high gate voltage; and a ninth transistor comprising a gate coupled to the second node, a first terminal coupled to the second node, and a second terminal coupled to the high gate voltage.

17. The scan driver of claim 16, wherein the first through ninth transistors are n-type metal-oxide (NMOS) thin-film transistors.

18. The scan driver of claim 16, wherein a size of the ninth transistor is larger than a size of the second transistor.

19. A display device, comprising:

a display panel comprising a plurality of pixels;

a data driver configured to provide a data signal to the pixels;

a scan driver comprising a plurality of stages, wherein each stage provides a scan signal to the pixels in response to receiving a scan start pulse and a plurality of clock signals; and a timing controller configured to control the data driver and the scan driver, wherein each stage of the scan driver comprises:

a first input circuit configured to apply a high gate voltage to a first node in response to receiving the scan start pulse, or the scan signal from a previous stage;

a second input circuit configured to apply a first one of the plurality of clock signals to a second node in response to a voltage of the first node;

a first output circuit configured to output a second one of the plurality of clock signals as the scan signal in response to the voltage of the first node;

a second output circuit configured to output a low gate voltage as the scan signal in response to a voltage of the second node; and a leakage circuit coupled to the high gate voltage, and configured to provide a current from the high gate voltage to the second node in response to the voltage of the second node having a high level, wherein the leakage circuit comprises a transistor comprising agate coupled to the second node, a first terminal coupled to the second node and a second terminal coupled to the high gate voltage.

* * * * *